United States Patent [19]

Imai et al.

[11] Patent Number: 5,959,797
[45] Date of Patent: Sep. 28, 1999

[54] MAGNETIC RECORDING APPARATUS HAVING MEANS FOR READING DATA ASSOCIATED WITH A NON-READABLE SERVO SECTOR

[75] Inventors: Hiroshi Imai; Fubito Igari, both of Tokyo, Japan

[73] Assignee: Kabushiki Kaisha Toshiba, Kawasaki, Japan

[21] Appl. No.: 08/887,344

[22] Filed: Jun. 24, 1997

Related U.S. Application Data

[63] Continuation of application No. 08/529,913, Sep. 18, 1995, abandoned.

[30] Foreign Application Priority Data

Sep. 7, 1995 [JP] Japan .................................. 7-230118

[51] Int. Cl.$^6$ ................................................ G11B 5/09
[52] U.S. Cl. ...................... 360/51; 360/53; 360/78.14; 360/77.08
[58] Field of Search .................... 360/78.14, 51, 360/53, 78.07, 77.08, 77.04, 47

[56] References Cited

U.S. PATENT DOCUMENTS

| 5,313,340 | 5/1994 | Takayama et al. | 360/51 X |
| 5,500,848 | 3/1996 | Best et al. | 360/48 X |
| 5,666,238 | 9/1997 | Igari et al. | 360/77.08 |

FOREIGN PATENT DOCUMENTS 5-174498  7/1993  Japan .

*Primary Examiner*—Alan Faber
*Attorney, Agent, or Firm*—Limbach & Limbach LLP

[57] ABSTRACT

A magnetic recording apparatus according to the present invention comprises a magnetic recording medium having a plurality of servo sectors and a plurality of data sectors on the tracks, first sensing means for sensing a first servo sector located before a target data sector and, on the basis of the first servo sector, sensing the target data sector, judging means for judging whether or not the first sensing means has sensed the first servo sector, and second sensing means for sensing the target data sector on the basis of a second servo sector different from the first servo sector, in response to the judging means judging that the first sensing means has failed to sense the first servo sector.

3 Claims, 3 Drawing Sheets

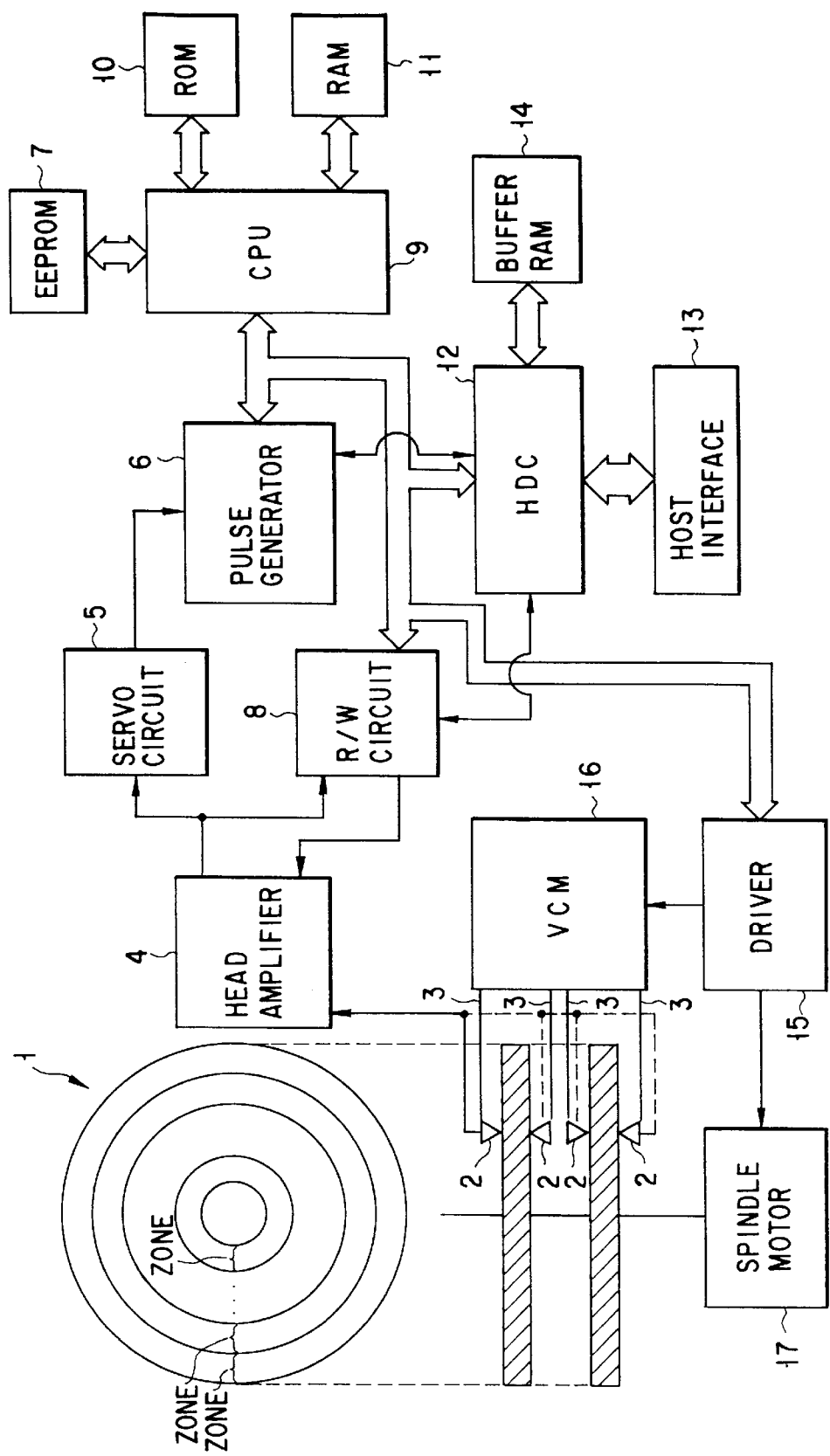
F I G. 1

MAGNETIC RECORDING APPARATUS HAVING MEANS FOR READING DATA ASSOCIATED WITH A NON-READABLE SERVO SECTOR

This is a continuation of application Ser. No. 08/529,913 filed on Sep. 18, 1995, now abandoned.

BACKGROUND OF THE INVENTION

1. Field of the Invention

This invention relates to a magnetic recording apparatus, and more particularly to a magnetic recording apparatus employing an IDless scheme where a data sector begin mark, data sector address information, etc. are not recorded at the head of each data sector, which is a recording unit of a recording medium.

2. Description of the Related Art

With a conventional magnetic recording apparatus, especially a magnetic disk apparatus, when the data is read, the head is positioned on the track where the target data sector to be read is present and then the target data sector is searched for and read.

In a magnetic disk apparatus employing an IDless scheme where a data sector begin mark, data sector address information, etc. are not recorded at the head of each data sector, which is a recording unit of a recording medium (disk), the read/write head scans over the track and senses a servo sector located before the target data sector (a servo sector address is read). By counting the data sector pulses generated with the timing based on the format table on the ROM (Read Only Memory) from when the servo sector has been sensed to when the counting reaches the number corresponding to the target data sector, the timing that the target data sector passes under the head is obtained. This enables the target data sector to be sensed (the data in the data sector is read).

When a servo sector is sensed, however, if the disk has dust on it or a flaw in it or the head is interfered with by noise, the servo sector address will not be read. In this case, it is only natural that the target sector cannot be sensed.

Should this happen, the settings of various parameters including filter constants will be changed and the sensing of the same servo sector will be tried. When the servo sector cannot be sensed no matter how many times the sensing has been tried, however, the sensing of the target data sector has to be abandoned.

SUMMARY OF THE INVENTION

Accordingly, the object of the present invention is to provide a magnetic recording apparatus capable of sensing the target data sector accurately, even if a servo sector located before the target data sector to be read cannot be sensed.

The foregoing object is accomplished by providing a magnetic recording apparatus comprising: a magnetic recording medium having a plurality of servo sectors and a plurality of data sectors on the tracks; first sensing means for sensing a servo sector located before a target data sector and, on the basis of the servo sector, sensing the target data sector; determining means for determining whether or not the first sensing means has sensed the servo sector; and second sensing means for sensing the target data sector on the basis of a servo sector different from the servo sector, in response to the judging means determining that the first sensing means has failed to sense the servo sector.

With the above configuration, even when the servo sector serving as a reference cannot be sensed, the target data sector can be sensed accurately and the data in the target data sector can be read out, by replacing the servo sector serving as a reference with another servo sector and determining the count from the time for the new servo sector until the time for the target data sector.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram of a magnetic recording apparatus according to an embodiment of the present invention, showing the overall configuration of the apparatus;

DETAILED DESCRIPTION OF THE PREFERRED EMBODIMENTS

Figure 2:
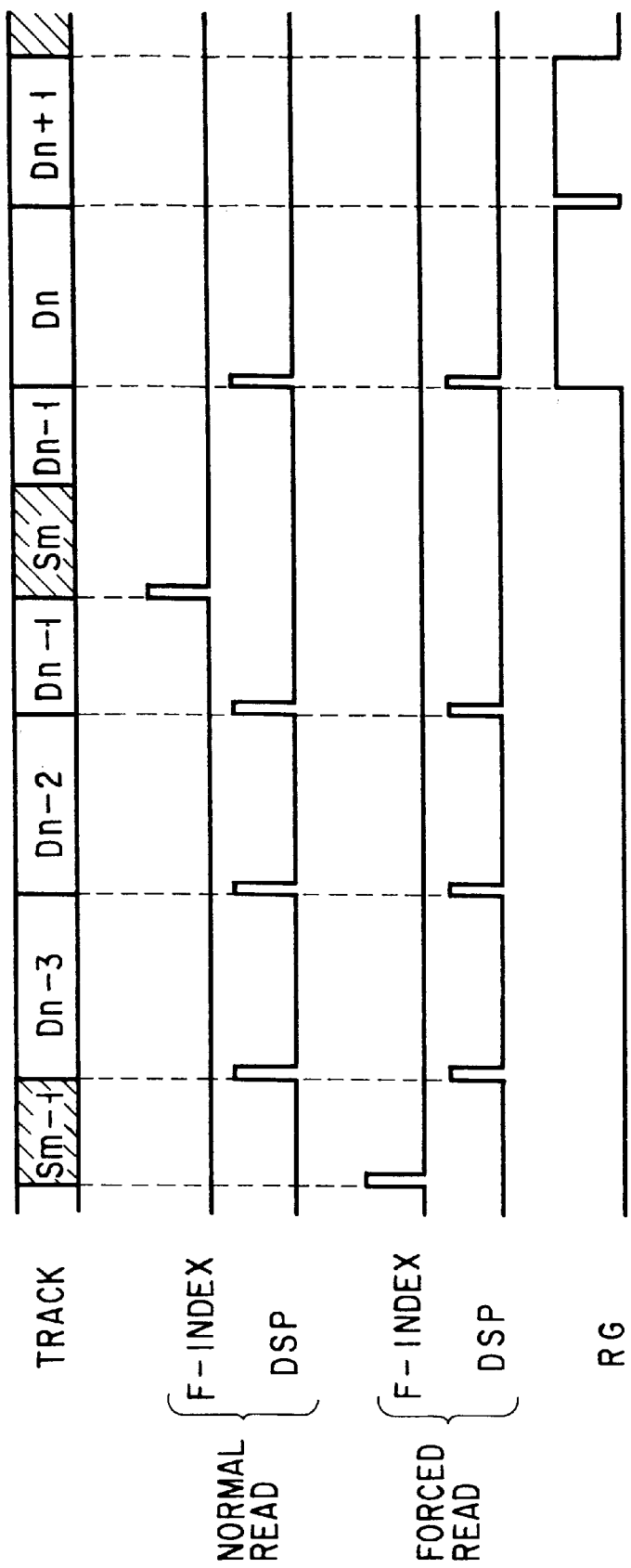
FIG. 2 is a diagram to help explain the difference between normal reading and forced reading in the magnetic recording apparatus of FIG. 1.

Hereinafter, referring to the drawings, an embodiment of the present invention will be explained.

FIG. 1 is a block diagram of a magnetic recording apparatus according to an embodiment of the present invention, showing the overall configuration of the apparatus. The magnetic recording apparatus employs a scheme where a data sector begin mark, sector address information, etc. are not recorded at the head of each recording unit (data sector) on a magnetic recording medium (an IDless scheme).

As shown in the figure, the magnetic disk apparatus is provided with a plurality of disks (or a single disk) 1, which serve as a magnetic recording medium. Both recording sides of each disk 1 are divided into concentric zones. Each zone is divided into a plurality of tracks (not shown). Each track is divided into a plurality of servo sectors (units of recording). As will be explained later, on each track, a plurality of servo sectors required to position the head are arranged at specific intervals. In each servo sector, servo information (including the servo sector address) is recorded.

Above both sides of each disk 1, two heads 2 are provided so as to face the both sides of the disk 1. Each of the heads 2 is provided on a carriage (a head moving mechanism) 3 and moves across the radius of the disk 1 as the carriage 3 rotates. This enables the heads 2 to be positioned on the desired track.

After having been positioned, the heads 2 scan over the track as the disk 1 rotates. In scanning, the heads 2 reads the servo information (including the servo sector address) in the servo sectors on the track sequentially. Also through scanning, the heads 2 read and write the data from and into each data sector. These pieces of servo information and read-out data items are sent to a head amplifier 4. When the data is sent from the head amplifier 4, the heads 2 write the data into data sectors.

The head amplifier 4 amplifies the read-out data sent from the heads 2. The head amplifier 4 processes the write data sent from a read/write circuit (R/W circuit) 8 and sends the processed signal to the heads 2. A servo circuit 5 extracts the servo information from the data sent from the head amplifier 4 and sends the servo information to a pulse generator circuit 6.

The pulse generator circuit 6 is composed of a gate array, for example. On the basis of the servo information sent from the servo circuit 5, the pulse generator circuit 6 transmits to a hard disk controller (HDC) 12 various signals that indicate the time at which each of the servo sectors and data sectors on the track passes under the heads 2 in the form of pulses.

More specifically, when receiving the servo sector address sent from the servo circuit 5, the pulse generator circuit 6 judges whether or not the servo data address coincides with the address of the servo sector (the reference servo sector) corresponding to the target servo sector. In this case, the address for the servo sector used as a reference has been set by firmware (explained later) previously. When they coincide with each other, the pulse generator circuit 6 sends a pulse signal called F-INDEX to the HDC 12.

Furthermore, when receiving a specific pattern of the servo sector sent from the servo circuit 5, the pulse generator circuit 6 generates an EOS (End Of Sector) signal indicating that a specific pattern of the servo sector has been sensed and sends the EOS signal to the HDC 12.

The pulse generator circuit 6 also generates the data sector pulses that indicate the time at which the heads pass over the head of each data sector and sends the pulses to the HDC 12. Namely, the pulse generator circuit 6 is designed to generate the data sector pulses at the time when each data sector passes under the heads 2.

A CPU (Central Processing Unit) 9 controls the overall operation of the magnetic recording apparatus. The CPU executes various processes according to firmware stored in a ROM 10.

For example, when receiving a read request from a host computer (not shown), the CPU 9 sends necessary instructions to the HDC 12. In other words, the CPU 9 makes necessary settings in the pulse generator circuit 6 and HDC so that the HDC 12 may provide timing control of the reading and writing of the data from and into the target data sector.

More specifically, the CPU 9 recognizes the contents of the read request sent from the host interface 13 side via the HDC 12, and examines the position of the target data sector to be read on the track. In this case, the CPU 9 refers to a table (not shown) stored in the ROM 10 and thereby determines the servo sector address of the target servo sector corresponding to the target data sector and count from the servo sector until the target data sector. The CPU 9 sets the obtained target servo sector address in the pulse generator circuit 6 and the obtained count in a register (not shown) within the HDC 12.

Furthermore, the CPU 9 refers to a status register in the HDC 12 and thereby monitors the state of data processing. For example, in a case where a read operation is in progress, when a data sector cannot be sensed (the data in a data sector cannot be read) for some reason, the CPU 9 refers to the status register in the HDC 12 and then determines the state. In this case, the CPU 9 changes the settings of various parameters (e.g., filter constants), and instructs the HDC 12 to effect reading again. Such a trial is made as many times as determined previously (e.g., 150 times).

According to the present embodiment, when normal reading cannot be effected even after a specific number of trials, the CPU 9 will effect forced reading associated with the present invention. The CPU 9 executes the force reading process according to firmware.

In the normal reading process, by starting to count a specified number of data sector pulses at the time when the head scans the servo sector immediately before the target data sector, the time when the head scans the target data sector can be obtained. In contrast, in the forced reading process, by starting to count a specified number of data sector pulses at the time when the head scans a servo sector other than the servo sector immediately before the target data sector (e.g., the servo sector two sectors before the target data sector), the time when the head scans the target data sector can be obtained. In this case, the count can be determined by referring to the table stored in the ROM 10 and computation.

When performing the forced reading process, the CPU 9 sets the servo sector address (the address of the servo sector two sectors before the target data sector) in the pulse generator circuit 6 and the newly obtained count in the register (not shown) in the HDC 12.

When succeeding in reading in the forced reading process, the CPU 9 judges whether to perform an automatic reassign process on data recording position. In this case, the data indicating whether the automatic reassign process should be allowed or not is set in an EEPROM 7. Therefore, the CPU 9 refers to the data and then judges whether to execute the automatic reassign process.

Furthermore, the CPU 9 temporarily stores the necessary data for various processes in the RAM (Random Access Memory) 11. The CPU 9 sends specific instruction signals to the pulse generator circuit 6, read/write circuit 8, HDC 12, and a driver 15. For example, the CPU 9 instructs the driver 15 so that a voice coil motor (VCM) 16 and a spindle motor 17 may perform a specific driving operation. It also provides control so that the read/write circuit 8 may effect data reading and writing with specific timing.

The read/write circuit 8 takes out the read-out data amplified at the head amplifier 4 and carries out the necessary process for a data reproduction process. The read/write circuit 8 executes the necessary signal process for a data recording process and supplies a write current corresponding to the write data to the heads 2 via the head amplifier 4.

On the basis of the F-INDEX pulse signal and data sector pulse signal sent from the pulse generator circuit 6, the HDC 12 reads and writes the data from and into the target data sector. Specifically, the HDC 12 counts only a specified number of data sector pulses after having received the F-INDEX pulse and thereby determines the time at which the target data sector reaches the head 2. The counting of data sector pulses is effected by using a built-in counter. The number that the HDC 12 should count has been set by firmware previously.

Furthermore, the HDC 12 sends sequentially to the read/write circuit 8 the write data sent from the host computer (not shown) via the host interface 13 and conversely transfers the read-out data sent from the read/write circuit 8 sequentially to the host computer via the host interface 13. The data transfer between the read/write circuit 8 and the buffer RAM 14 is controlled by a data transfer control circuit (not shown) in the HDC 12.

When receiving a series of write data items from the host interface 13, the HDC 12 informs the CPU 9 of the arrival of the write data and temporarily stores the write data in the buffer RAM 14, and thereafter sends the write data items sequentially to the read/write circuit 8. On the other hand, when receiving a series of read-out data items from the read/write circuit 8, the HDC 12 notifies the CPU 9 of the arrival of the read-out data and temporarily stores the read-out data in the buffer RAM 14, and thereafter sends the read-out data items sequentially to the host interface 13.

The driver 15 performs control according to the instruction from the CPU 9 so that the VCM 16 and spindle motor 17 may carry out a specific driving operation. The VCM 16, whose operation is controlled by the driver 15, moves the carriage 3 across the radius of the disk 1. In this case, the drive 15 moves the carriage 3 so that the heads may scan over the track in which the desired data sector is present.

The spindle motor 17, whose operation is also controlled by the driver 15, rotates the disk 1. The spindle motor 17 rotates the disk 1 at a constant angular velocity.

Hereinafter, the difference between the normal reading process and the forced reading process will be described with reference to FIG. 2.

The normal reading process differs from the forced reading process in the time when the pulse generator circuit 6 generates an F-INDEX pulse. Here, as shown in FIG. 2, in part of the track, data sectors Dn−3 to Dn+1 including the target data sector Dn are arranged in sequence. Furthermore, servo sectors Sm−1 and Sm are placed at specific intervals.

In the normal reading process, an F-INDEX pulse is generated at the head of the servo sector Sm located before the target data sector Dn. In this case, at the time when a single data sector pulse is counted since the generation of an F-INDEX pulse, reading is started.

On the other hand, in the forced reading process, because servo sector Sm cannot be sensed, an F-INDEX pulse is generated at the head of servo sector Sm−1 one sector before servo sector Sm. In this case, at the time when four data sector pulses are counted since the generation of an F-INDEX, reading is started. Therefore, even if servo sector Sm cannot be sensed, the target data sector Dn can be sensed.

Figure 3:
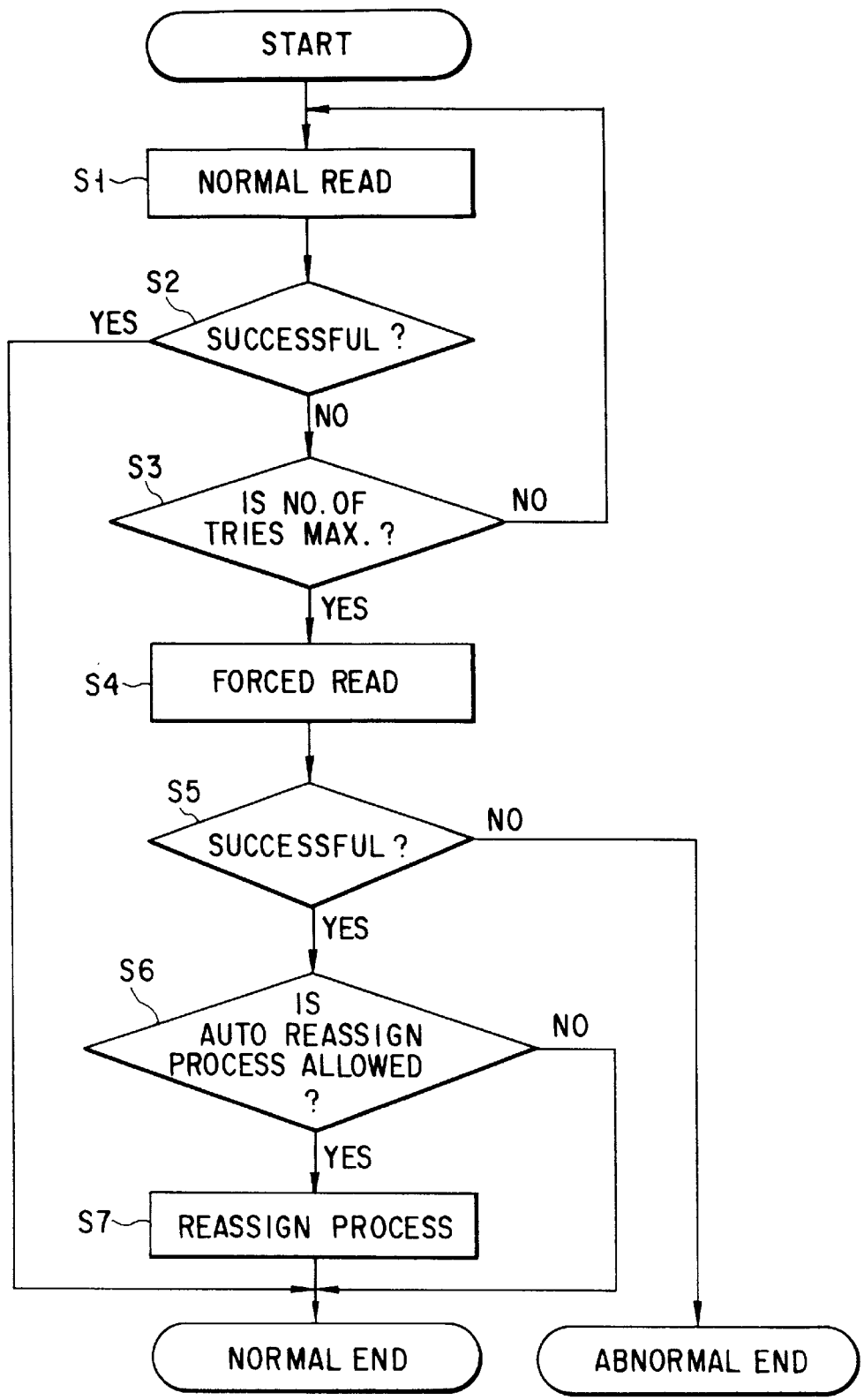
FIG. 3 is a flowchart for the operation of the magnetic recording apparatus of FIG. 1.

Referring to the flowchart of FIG. 3, the operation of the magnetic recording apparatus will be explained, focusing on the process of reading the data from a series of data sectors.

After there has been a read request from the host computer, the head has been positioned on the track in which the target data sector is present and the head is now scanning over the track.

First, the normal reading process is carried out (step S1). In this process, the CPU 9 effects the necessary settings in the pulse generator circuit 6 and HDC 12 so that the HDC 12 may provide timing control of the reading from the target data sector. In this case, the CPU 9 refers to the table (not shown) stored in the ROM 10 and thereby determines the servo sector address of the servo sector corresponding to the target data sector and the count from the servo sector until the target data sector. The CPU 9 sets the obtained servo sector address in the pulse generator circuit 6 and the obtained count in the register in the HDC 12.

Next, a check is made to see if the normal reading is successful (step S2). In this process, the CPU 9 checks the state of the data processing at the HDC 12 by referring to the status register in the HDC 12. Specifically, in the reading process, when the data in a data sector cannot be read for some reason, the CPU 9 refers to the status register in the HDC 12 and thereby determines the state. For example, when there is dust on the disk 1 or the head 2 is interfered with by noise, there is a possibility that a servo sector immediately before the target servo data cannot be sensed and the reading will be unsuccessful. If the reading is successful, the process will finish properly.

If the reading is unsuccessful, it will be judged whether or not the number of consecutive trials in the normal reading has reached the set number of times (step S3). If the set number of times has not been reached, the CPU 9 will change the settings of various parameters (e.g., filter constants) and instruct the HDC 12 to try normal reading. Such a trial is supposed to be made a previously set number of times.

If the set number of times has been reached, a trial will be abandoned and forced reading according to the present invention will be effected (step S4). In the forced reading process, by using a servo sector (e.g., one sector) before the servo sector that could not be sensed as a reference, the time for the target data sector is obtained. In this case, the CPU 9 refers to the table stored in the ROM 10 and performs calculations and thereby determines the servo sector address of the servo sector serving as a reference and the count from the reference servo sector until the target data sector. Then, the CPU 9 sets the obtained servo sector address in the pulse generator circuit 6 and the obtained count in the register in the HDC 12.

With the setting, when receiving the servo sector address coinciding with the set servo sector address from the servo circuit 5, the pulse generator circuit 6 sends the F-INDEX pulse to the HDC 12. At this time, the data sector pulses are also sent to the HDC 12 sequentially. Using the F-INDEX pulse sent from the pulse generator circuit 6 as a reference, the HDC 12 counts up to the number set in the counter and thereby causes the read/write circuit 8 to start reading at the time for the target data sector.

Then, it is judged whether or not the forced reading is successful (step S5). If it is not-successful, an abnormal end will result. If it is successful, it is judged whether or not an automatic reassign process of data recording position is allowed (step S6). In this case, the CPU 9 makes the judgment by referring to the data set in the EEPROM 7. If it is not allowed, nothing will be done and the process will finish properly.

If it is allowed, the CPU will execute the automatic reassign process according to the processing procedure previously set by firmware (step S7), and the process will end properly. This enables the data in the data sector subjected the forced reading to be stored in another storage area, so that forced reading need not be effected when the data is read next time.

As described, with the embodiment, when normal reading cannot be done even after a trial has been made repeatedly, effecting forced reading enables the target data sector to be sensed and the data in the data sector to be read out. After the forced reading has finished, the automatic reassign process is performed, so that forced reading need not be done for the data next time.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

As described above, with the present invention, even when the servo sector serving as a reference cannot be sensed, the target data sector can be sensed accurately and the data in the target data sector can be read out by replacing the servo sector serving as a reference with another one, and determining the count from the time for the new servo sector until the time for the target data sector.

What is claimed is:

1. A magnetic recording apparatus comprising:

a magnetic recording medium having a plurality of servo sectors and a plurality of data sectors on the tracks;

first sensing means for sensing a first servo sector located before a target data sector and, on the basis of the first servo sector, sensing said target data sector;

judging means for judging whether or not said first sensing means has sensed said first servo sector;

second sensing means for sensing said target data sector on the basis of a second servo sector different from said first servo sector, in response to said judging means judging that said first sensing means has failed to sense said first servo sector; and means for executing an automatic reassign process on the data in said target data sector after said second sensing means has sensed said target data sector such that an operation by said second sensing means is omitted when the corresponding data is next accessed.

2. A magnetic recording apparatus according to claim 1, further comprising means for allowing said execution means to execute the automatic reassign process.

3. A magnetic recording apparatus comprising:

a magnetic recording medium having a plurality of servo sectors and a plurality of data sectors on the tracks;

first sensing means for sensing a first servo sector located before a target data sector and, on the basis of the first servo sector, sensing said target data sector;

judging means for judging whether or not said first sensing means has sensed said first servo sector;

second sensing means for sensing said target data sector on the basis of a second servo sector different from said first servo sector, in response to said judging means judging that said first sensing means has failed to sense said first servo sector; and means for executing an automatic reassign process on the data in said target data sector after said second sensing means has sensed said target data sector, wherein said automatic reassign process enables the data in said target data sector to be stored in another storage area so that the sensing by said second sensing means need not be effected when the data is next accessed.

* * * * *